Nov. 24, 1925.                                           1,563,040
C. S. PRESTON
SHOCK ABSORBER
Filed July 25, 1923
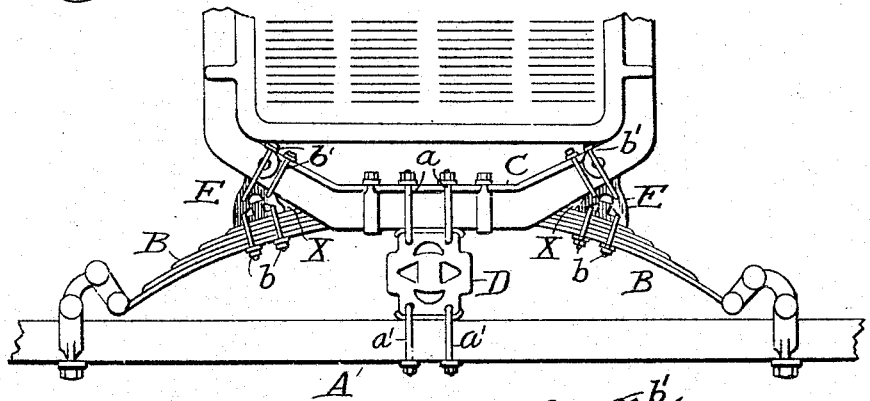
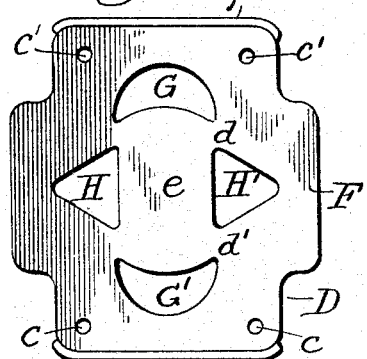 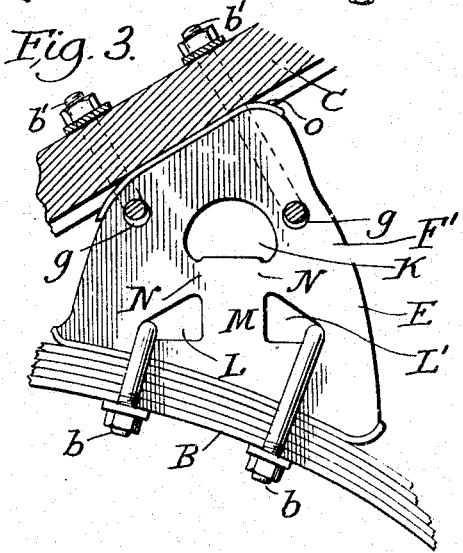
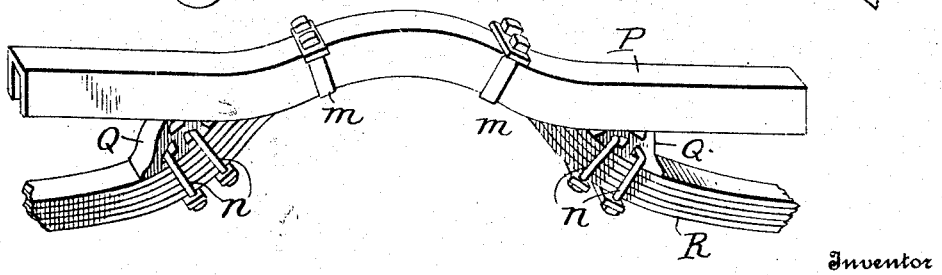
Inventor
Clarence S. Preston,
By Edson ~~~
Attorneys Patented Nov. 24, 1925.

1,563,040

UNITED STATES PATENT OFFICE.

CLARENCE S. PRESTON, OF SAN DIEGO, CALIFORNIA.

SHOCK ABSORBER.

Application filed July 25, 1923. Serial No. 653,726.

*To all whom it may concern:*

Be it known that I, CLARENCE S. PRESTON, a citizen of the United States, residing at San Diego, in the county of San Diego and State of California, have invented certain new and useful Improvements in Shock Absorbers, of which the following is a specification.

This invention relates to shock absorbers of the solid resilient type adapted particularly to be used on motor vehicles, and more especially the Ford automobile.

The principal object of my invention is to provide a shock absorber of resilient material, such as rubber or other elastic material, provided with transverse voids for the interior displacement of solid matter, to be used in connection with the springs of motor vehicles to resist extra heavy shock and prevent it from being transmitted to the vehicle body.

Another object is to provide a shock absorber to be used in connection with an automobile bumper or car buffer to absorb extra heavy shock and prevent it from being transmitted to the body of the automobile or car.

Another object is to provide a lightly and cheaply constructed shock absorber having transverse voids to reduce wind resistance when the vehicle is in motion.

Another object is to provide for fastening this shock absorber to the springs, if desired, to the cross bar, or car frame, above to break the rebound shock as well as the shock on the downward thrust, as the rebound shock is quite as objectionable as the downward shock.

Another object is to provide a resilient shock absorber to be used in connection with a spring or bumper to prevent same from being bent or broken by a heavy impact or shock.

The matter constituting my invention will be defined in the claims.

I will now describe my invention in detail by reference to the accompanying drawings, in which—

Figure 1 represents a part of the front end of an automobile in elevation showing my invention embodied therein.

Fig. 2 represents an elevation of a modification.

Fig. 3 shows a detail of my invention.

Fig. 4 represents a rear end view of a portion of the frame and rear spring having my invention embodied therein.

The shock absorber D, as shown in Fig. 2 of the accompanying drawing, is designed to be used between the center of the front axle A and radiator frame C, as shown in Fig. 1.

The shock absorber E, of a modified type, as shown in Fig. 3, is designed to be used at the points X—X, as shown in Fig. 1.

The shock absorber D, Fig. 1, and Fig. 2, is composed of resilient material F, such as rubber or rubber compound, and is provided with voids H, H', G, G', $c$ and $c'$; a resilient core $e$, elastic webs $d$ and $d'$, and reinforcement material $f$ and $f'$, said reinforcement material being provided to prevent friction from wearing away the resilient material F. When subjected to road shock the suspended elastic webs $d$ and $d'$ are forced by the resilient core $e$ into the voids L and L' or H and H' as well as into the voids G and G', thereby appreciably reducing the shock which would otherwise be transmitted to the vehicle body. The voids $c$ and $c'$ serve to reduce the shock by providing for interior displacement of the solid matter and are also designed for the straps $a$ and $a'$, of suitable material to be passed through them and secured to the axle A, and, if desired, to the frame C, as shown in Fig. 1. By securing the shock absorber to both the frame and axle, objectionable shock from the rebound is materially reduced, and the danger of the spring being broken by the force of the rebound is also prevented.

The shock absorber E, Fig. 3, of a modified form, is designed to fit in the angles X—X, as shown in Fig. 1, formed between the frame C and springs B—B. It is composed of resilient material F' and is provided with the voids K, L, L', and $g$, $g$, rib or core M, of resilient material, and elastic webs N, N, suspended between the voids L and L', and the void K. When under pressure or shock the rib M is forced into the void K, thereby absorbing the said road shock and preventing it from being transmitted to the vehicle body. The suspensory webs N are also forced into the voids L, L', and K, when subjected to pressure or road shock. Straps $b$—$b$, of a suitable material, are designed to be passed through the voids L and L' and around the springs B—B, and straps $b'$—$b'$ are designed to be passed through the voids $g$—$g$ and around the frame C, if desired, thus holding the shock absorber E firmly in place for the purpose of reducing the shock from the rebound.

The shock absorber D, Fig. 2, may be used in other positions and locations from that shown, if desired.

In Fig. 4 the shock absorbers Q—Q are shown placed in the angles formed by the frame member P and the springs R, the said shock absorbers being fastened to the springs R by the straps $n$—$n$. The straps $n$—$n$ hold the spring to the frame member P.

The principle of my invention is to provide in a body of resilient material, having suitable voids, ribs and elastic webs, for the displacement of the solid resilient material when subjected to road shock or impact. It may be made in various shapes, according to the location in which it is to be placed, and may be used in any place in a vehicle body where it is found convenient and where it will reduce the road shock or shock from an impact, keeping in mind the principle of suspensory webs and voids so placed as to allow for internal displacement of the solid matter when the shock absorber is subjected to pressure or road shock.

I claim:

1. The combination with a vehicle chassis, including a main supporting spring, of a shock absorber comprising a body of resilient material, a core of resilient material in the center thereof and running transversely therethrough, said body having voids arranged about said core and running parallel therewith, elastic webs suspended between the voids adjacent the central resilient core, whereby when said body of resilient material is subjected to shock the solid material thereof will be forced into the said voids, and means, comprising straps passing through said resilient body, for fastening the same to the adjacent portion of the chassis.

2. The combination with a vehicle chassis, including a main supporting spring, of a shock absorber arranged upon said spring, comprising a body of resilient material, provided with a core running transversely through the center of said shock absorber, a layer or fabric at the top and bottom of said shock absorber to prevent it from being worn by friction, said resilient body having voids passing transversely therethrough parallel with the top and bottom thereof for the insertion of straps to fasten the said shock absorber to the spring and to a portion of the chassis adjacent the spring.

3. The combination with a vehicle, including a spring, of a shock absorber adapted to be supported on said spring, comprising a body of resilient material, provided with a core of resilient material, voids adjacent thereto, elastic webs suspended between said voids, designed to be forced into said voids by said core when subjected to pressure, resilient material between the top void and the top of the shock absorber which is forced into the top void when subjected to pressure, resilient material between the bottom voids and the bottom of the shock absorber, which is forced into the bottom voids when subjected to pressure resulting from road shock or impact from a collision, and means to secure the shock absorber to the spring and to an adjacent portion of the vehicle.

4. The combination with a vehicle frame including a main supporting spring, of a shock absorber adapted to be arranged in the angle between the frame and the spring adjacent their juncture, said shock absorber having a body of resilient material, said body being provided with transversely extending voids, and a rib therebetween, and means to secure the shock absorber to the spring and to the vehicle frame whereby the shock absorber will prevent undue rebound from shocks.

5. The combination with a vehicle frame, including a spring, of a shock absorber arranged between the spring and adjacent portions of the frame, said shock absorber comprising a body of resilient material, said body being provided with transverse substantially centrally arranged voids, said body also having voids through which straps may be passed to fasten the shock absorber to the spring, and means for fastening the shock absorber to the adjacent portion of the vehicle frame, whereby the shock absorber will also function to resist the rebound from shocks, due to the pull of the rebound being transmitted to the shock absorber by means of the straps.

In testimony whereof I affix my signature.

CLARENCE S. PRESTON.